(12) United States Patent
Shrivastava et al.

(10) Patent No.: US 10,984,272 B1
(45) Date of Patent: Apr. 20, 2021

(54) DEFENSE AGAINST ADVERSARIAL ATTACKS ON NEURAL NETWORKS

(71) Applicants: Ashish Shrivastava, Santa Clara, CA (US); Cuneyt Oncel Tuzel, Cupertino, CA (US); Seyed Moosavi-Dezfooli, Pully (CH)

(72) Inventors: Ashish Shrivastava, Santa Clara, CA (US); Cuneyt Oncel Tuzel, Cupertino, CA (US); Seyed Moosavi-Dezfooli, Pully (CH)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 16/241,011

(22) Filed: Jan. 7, 2019

Related U.S. Application Data (60) Provisional application No. 62/677,891, filed on May 30, 2018, provisional application No. 62/619,411, filed on Jan. 19, 2018.

(51) Int. Cl.
  *G06K 9/00* (2006.01)
  *G06K 9/03* (2006.01)
  (Continued)

(52) U.S. Cl.
  CPC .............. *G06K 9/03* (2013.01); *G06F 16/55* (2019.01); *G06K 9/4671* (2013.01); *G06N 3/08* (2013.01);
  (Continued)

(58) Field of Classification Search
  CPC ................. G06K 9/03; G06K 9/4671; G06K 2009/4695; G06F 16/55; G06N 3/08; G06T 5/002
  (Continued)

(56) References Cited

U.S. PATENT DOCUMENTS

| 2006/0147101 A1* | 7/2006 | Zhang ...................... G06T 5/30 382/131 |
| 2008/0130022 A1* | 6/2008 | Dalal ................... H04N 1/6058 358/1.9 |

(Continued)

OTHER PUBLICATIONS

Abu-El-Haija, Sami, et. al., "YouTube-8M: A Large-Scale Video Classification Benchmark", Cornell University Library, Computer Vision and Pattern Recognition, https://arxiv.org/abs/1609.08675, Sep. 27, 2016, 10 pp.

(Continued)

*Primary Examiner* — Stephen P Coleman
(74) *Attorney, Agent, or Firm* — Young Basile Hanlon & MacFarlane, P.C.

(57) ABSTRACT

A neural network is trained to defend against adversarial attacks, such as by preparing an input image for classification by a neural network where the input image includes a noise-based perturbation. The input image is divided into source patches. Replacement patches are selected for the source patches by searching a patch library for candidate patches available for replacing ones of those source patches, such as based on sizes of those source patches. A denoised image reconstructed from a number of replacement patches is then output to the neural network for classification. The denoised image may be produced based on reconstruction errors determined for individual candidate patches identified from the patch library. Alternatively, the denoised image may be selected from amongst a number of candidate denoised images. A set of training images is used to construct the patch library, such as based on salient data within patches of those training images.

20 Claims, 7 Drawing Sheets

(51) Int. Cl.
  *G06T 5/00* (2006.01)
  *G06K 9/46* (2006.01)
  *G06F 16/55* (2019.01)
  *G06N 3/08* (2006.01)

(52) U.S. Cl.
  CPC ...... *G06T 5/002* (2013.01); *G06K 2009/4695* (2013.01)

(58) Field of Classification Search
  USPC .......................................................... 382/155
  See application file for complete search history.

(56) References Cited

U.S. PATENT DOCUMENTS

| | | | | |
|---|---|---|---|---|
| 2012/0288015 | A1* | 11/2012 | Zhang | H04N 19/14 375/240.26 |
| 2017/0024864 | A1* | 1/2017 | Karande | G06T 7/13 |
| 2017/0132763 | A1* | 5/2017 | Salvador Marcos | G06K 9/6218 |

OTHER PUBLICATIONS

Aharon, Michal, et. al., "K-SVD: An Algorithm for Designing Overcomplete Dictionaries for Sparse Representation", IEEE Transactions on Signal Processing, vol. 54, No. 11, Nov. 2006, 12 pp.

Baluja, Shumeet, et. al., "Adversarial Transformation Networks: Learning to Generate Adversarial Examples", Cornell University Library, Neural and Evolutionary Computing, https://arxiv.org/abs/1703.09387, Mar. 28, 2017, 13 pp.

Bhagoji, Arjun Nitin, et. al., "Enhancing Robustness of Machine Learning Systems via Data Transformations", Cornell University Library, Cryptography and Security, https://arxiv.org/abs/1704.02654, Nov. 29, 2017, 15 pp.

Brown, Tom B., et. al., "Adversarial Patch", Cornell University Library, Computer Vision and Pattern Recognition, https://arxiv.org/abs/1712.09665, May 17, 2018, 5 pp.

Carrlini, Nicholas, et. al., "Towards Evaluating the Robustness of Neural Networks", Cornell University Library, Cryptography and Security, https://arxiv.org/abs/1608.04644, Mar. 22, 2017, 19 pp.

Carlini, Nicholas, et. al., "Adversarial Examples Are Not Easily Detected: Bypassing Ten Detection Methods", Cornell University Library, Computer Science, Learning; Cryptography and Security, https://arxiv.org/abs/1705.07263, Nov. 1, 2017, 12 pp.

Xiao, Chaowei, et. al., "Spatially Transformed Adversarial Examples", Cornell University Library, Computer Science, Cryptography and Security, https://arxiv.org/abs/1801.02612?context=cs, Jan. 9, 2018, 29 pp.

Cisse, Moustapha, et. al., "Hodini: Fooling Deep Structured Visual and Speech Recognition Models With Adversarial Examples", Advances in Neural Information Processing Systems 30, NIPS 2017, http://papers.nips.cc/paper/7273-houdini-fooling-deep-structured-visual-and-speech-recognition-models-with-adversarial-examples, 11 pp.

Deng, Jia, et. al., "ImageNet: A Large-Scale Hierarchical Image Database", IEEE Conference on Computer Vision and Pattern Recognition, Jun. 20, 2009, https://ieeexplore.ieee.org/document/5206848/, 8 pp.

Elad, Michael, "Sparse and Redundant Representation, From Theory to Applications in Signal and Image Processing", Springer-Verlag New York, Published Aug. 12, 2010, https://www.springer.com/us/book/9781441970107, 397 pp.

Fawzi, Alhussein, et. al., "Analysis of Classifiers' Robustness to Adversarial Perturbations", Cornell University Library, Computer Science, Learning, https://arxiv.org/abs/1502.02590, Mar. 28, 2016, 19 pp.

Fawzi, Alhussein, et. al., "Robustness of Classifiers: from Adversarial to Random Noise", Cornell University Library, Computer Science, Learning, https://arxiv.org/abs/1608.08967, Aug. 31, 2016, 9 pp.

Feinman, Reuben, et. al., "Detecting Adversarial Samples from Artifacts", Cornell University Library, Statistics, Machine Learning, https://arxiv.org/abs/1703.00410, Nov. 15, 2017, 9 pp.

Goodfellow, Ian J., et. al., "Generative Adversarial Nets", Cornell University Library, Statistics, Machine Learning, https://arxiv.org/abs/1406.2661, Jun. 10, 2014, 9 pp.

Goodfellow, Ian J., et. al., "Explaining and Harnessing Adversarial Examples", Cornell University Library, Statistics, Machine Learning, https://arxiv.org/abs/1412.6572, Mar. 20, 2015, 11 pp.

Gu, Shixiang, et. al., "Towards Deep Neural Network Architectures Robust to Adversarial Examples", Cornell University Library, Computer Science, Learning, https://arxiv.org/abs/1412.5068, Apr. 9, 2015, 9 pp.

Guo, Chuan, et. al., "Countering Adversarial Images Using Input Transformations", Cornell University Library, Computer Science, Computer Vision and Pattern Recognition, https://airxiv.org/abs/1711.00117, Jan. 25, 2018, 12 pp.

Hayes, Jamie, et. al., "Learning Universal Adversarial Perturbations With Generative Models", Cornell University Library, Computer Science, Cryptography and Security, https://arxiv.org/abs/1708.05207, Jan. 5, 2018, 13 pp.

He, Kaiming, et. al., "Deep Residual Learning for Image Recognition", Cornell University Library, Computer Science, Computer Vision and Pattern Recognition, https://arxiv.org/abs/1512.03385, Dec. 10, 2015, 12 pp.

Hein, Matthias, et. al., "Formal Guarantees on the Robustness of a Classifier Against Adversarial Manipulation", Cornell University Library, Computer Science, Learning, https://arxiv.org/abs/1705.08475, Nov. 5, 2017, 21 pp.

Hendrycks, Dan, et. al., "Early Methods for Detecting Adversarial Images", Cornell University Library, Computer Science, Learning, https://arxiv.org/abs/1608.00530, Mar. 23, 2017, 9 pp.

Kanbak, Can, et. al., "Geometric Robustness of Deep Networks: Analysis and Improvements", Cornell University Library, Computer Science, Computer Vision and Pattern Recognition, https://arxiv.org/abs/1711.09115, Nov. 24, 2017, 9 pp.

Github.com, "Open Images Dataset V3", GitHub—openimages/dataset: The Open Images dataset, https://github.com/openimages/dataset, downloaded Apr. 30, 2018, 11 pp.

Lin, Tsung-Yi, et. al., "Microsoft COCO: Common Objects in Context", Cornell University Library, Computer Science, Computer Vision and Pattern Recognition, https://arxiv.org/abs/1405.0312, Feb. 21, 2015, 15 pp.

Liu, Yanpei, et. al., "Delving Into Transferable Adversarial Examples and Black-Box Attacks", Cornell University Library, Computer Science, Learning, https://arxiv.org/abs/1611.02770, Feb. 7, 2017, 14 pp.

Madry, A., et. al., "Towards Deep Learning Models Resistant to Adversarial Attacks", Cornell University Library, Statistics, Machine Learning, https://arxiv.org/abs/1706.06083, Nov. 9, 2017, 27 pp.

Mairal, J., et. al., "Sparse Representation for Color Image Restoration", IEEE Transactions on Image Processing, vol. 17, No. 1, Jan. 2008, 17 pp.

Mallat, S., et. al., "Matching Pursuits With Time-Frequency Dictionaries", IEEE Transactions on Signal Processing, vol. 41, No. 12, Dec. 1993, 19 pp.

Metzen, Jan H., et. al., "Universal Adversarial Perturbations Against Semantic Image Segmentation", Cornell University Library, Statistics, Machine Learning, https://arxiv.org/abs/1704.05712, Jul. 31, 2017, 17 pp.

Metzen, Jan H., et. al., "On Detecting Adversarial Perturbations", Cornell University Library, Statistics, Machine Learning, https://arxiv.org/abs/1702.04267, Feb. 21, 2017, 12 pp.

Moosavi-Dezfooli, S., et. al., "DeepFool: a simple and accurate method to fool deep neural networks", Cornell University Library, Computer Science, Learning, https://arxiv.org/abs/1511.04599, Jul. 4, 2016, 9 pp.

Moosavi-Dezfooli, S., et. al., "Universal adversarial perturbations", Cornell University Library, Computer Science, Computer Vision and Pattern Recognition, https://arxiv.org/abs/1610.08401, Mar. 9, 2017, 11 pp.

Mopuri, K. R., et. al., "Fast Feature Fool: A data independent approach to universal adversarial perturbations", Cornell University (56) References Cited

OTHER PUBLICATIONS

Library, Computer Science, Computer Vision and Pattern Recognition, https://arxiv.org/abs/1707.05572, Jul. 18, 2017, 12 pp.

Narodytska, N., et. al., "Simple Black-Box Adversarial Perturbations for Deep Networks", Cornell University Library, Computer Science, Learning, https://arxiv.org/abs/1612.06299, Dec. 19, 2016, 19 pp.

Papernot, N., et. al., "Distillation as a Defense to Adversarial Perturbations against Deep Neural Networks", Cornell University Library, Computer Science, Cryptography and Security, https://arxiv.org/abs/1511.04508, Mar. 14, 2016, 16 pp.

Pati, Y.C., et. al., "Orthogonal Matching Pursuit: Recursive Function Approximation with Applications to Wavelet Decomposition", Proc. of the 27th Annual Asilomar Conference on Signals Systems and Computers, Nov. 1, 1993, 5 pp.

Shrivastava, A., et. al., "Generalized Dictionaries for Multiple Instance Learning", SpringerLink, https://link.springer.com/article/10.1007/s11263-015-0831-z, International Journal of Computer Vision, Sep. 2015, vol. 114, Issue 2-3, pp. 288-305, 20 pp.

Sinha A., et. al., "Certifiable Distributional Robustness With Principled Adversarial Training", Cornell University Library, Statistics, Machine Learning, https://arxiv.org/abs/1710.10571v3, Jan. 9, 2018, 39 pp.

Szegedy, C., et. al., "Intriguing Properties of Neural Networks", Cornell University Library, Computer Science, Computer Vision and Pattern Recognition, https://arxiv.org/abs/1312.6199, Feb. 19, 2014, 10 pp.

Tramer, F., et. al., "Ensemble Adversarial Training: Attacks and Defense", Cornell University Library, Statistics, Machine Learning, https://arxiv.org/abs/1705.07204, Jan. 30, 2018, 20 pp.

Wright, J., et. al., "Sparse Representation for Computer Vision and Pattern Recognition", Proceedings of IEEE, Mar. 2009, 10 pp.

Zhang, Y., et. al., "Augmenting Supervised Neural Networks With Unsupervised Objectives for Large-Scale Image Classification", Cornell University Library, Computer Science, Learning, https://arxiv.org/abs/1606.06582, Jun. 21, 2016, 10 pp.

* cited by examiner

DEFENSE AGAINST ADVERSARIAL ATTACKS ON NEURAL NETWORKS

CROSS-REFERENCE TO RELATED APPLICATIONS

This application claims the benefit of U.S. provisional application No. 62/619,411, filed on Jan. 19, 2018. This application also claims the benefit of U.S. provisional application No. 62/677,891, filed on May 30, 2018. The contents of the foregoing applications are incorporated by reference in their entireties herein for all purposes.

TECHNICAL FIELD

This disclosure relates to defenses against attacks on neural networks.

BACKGROUND

Machine learning approaches, such as deep neural networks, are trained to perform tasks based on examples. A set of examples provided to a machine learning approach may be referred to as training data or a training data set. Training data can include annotations, which may be referred to as ground truth information and which describe the content of each example in the training data. For example, a machine learning approach can be trained to recognize the presence or absence of a feature in an image, providing the machine learning model with a large number of example images and annotations that indicate, for each of the training images, whether or not the feature is present.

SUMMARY

One implementation disclosed herein includes a method for preparing an input image for classification by a neural network. The method comprises dividing the input image into source patches. At least one of the source patches includes a noise-based perturbation. The method further comprises selecting replacement patches for the source patches. Selecting the replacement patches includes: identifying candidate patches available for replacing a respective source patch within the input image; determining reconstruction errors based on differences between the respective source patch and ones of the candidate patches; and determining, based on the reconstruction errors, the replacement patch for the respective source patch using one or more of the candidate patches. The method further comprises using the replacement patches selected for the source patches to produce a denoised image. The denoised image does not include the noise-based perturbation. The method further comprises outputting the denoised image to the neural network for classification.

Another implementation disclosed herein includes an apparatus for preparing an input image for classification by a neural network. The apparatus comprises a memory and a processor. The processor is configured to execute instructions stored in the memory to receive the input image. The input image includes source patches. At least one of the source patches includes a noise-based perturbation. The processor is further configured to execute instructions stored in the memory to produce candidate denoised images based on combinations of candidate patches available to replace ones of the source patches within the input image. The processor is further configured to execute instructions stored in the memory to select, as a denoised image, a one of the candidate denoised images having a lowest reconstruction error. The processor is further configured to execute instructions stored in the memory to output the denoised image to the neural network for classification.

Another implementation disclosed herein includes a non-transitory computer-readable storage device including program instructions executable by one or more processors that, when executed, cause the one or more processors to perform operations for using a patch library to prepare an input image for classification by a neural network. The operations comprise receiving training images. Each of the training images includes training patches. The operations further comprise producing saliency maps based on comparisons of collocated training patches from different ones of the training images. The operations further comprise identifying a subset of the saliency maps reflecting differences between the ones of the training images. The operations further comprise constructing the patch library based on the subset of the saliency maps. The patch library includes a set of candidate patches available for replacing a source patch within the input image. The source patch includes a noise-based perturbation. The operations further comprise producing a denoised image using at least some of the set of candidate patches. None of the candidate patches used to produce the denoised image includes the noise-based perturbation. The operations further comprise outputting the denoised image to the neural network for classification.

DETAILED DESCRIPTION

Deep neural networks learn to classify various types of data through training and inference operations. For example, image data can be processed by a deep neural network to identify the visual content represented by the image data. The deep neural network uses the identified visual content to learn how to classify other image data it later receives. However, adversarial perturbations in the data processed by a typical deep neural network may cause that deep neural network to become unstable, such as by causing the deep neural network to misclassify the data it subsequently processes.

For example, let $f_\theta(x): \mathbb{R}^d \to \mathbb{N}$ be a classifier parameterized by $\theta$ that computes the class of an input image $x$, where $\mathbb{N}$ is the set of natural numbers denoting class labels. An adversary can perturb the image with noise v such that $f_\theta(x) \neq f_\theta(x+v)$. The norm of the noise may be kept small so that the corrupted image appears the same as the original image to a human observer. The robustness of the classifier at $x_0$ can be defined as the minimum perturbation needed to change the predicted label. In many cases, the noise can be scaled to make the attack stronger.

One solution to defend against these adversarial perturbations is to improve the robustness of the deep neural network by learning a stable transformation, represented, for example, by $f_\theta(T(x))=f_\theta(T(x+v))$. However, the transformation of the input image may not adequately prevent or mitigate an adversarial attack where the manner in which the transformation occurs is exposed. Given that many such attacks rely on computing gradients of a classification function with respect to the input, it may be advantageous to use a non-differentiable transformation, such as to prevent exposing details of the transformation.

Implementations of this disclosure address problems such as these using non-differentiable reproductions of input images using patches that do not include noise-based perturbations. An input image is divided into multiple patches, and each patch is denoised independently to reconstruct the image, without losing much of the image content. In some cases, the input image is divided into multiple overlapping patches. Each patch is reconstructed with a matching pursuit algorithm using a set of reference patches. These reference patches are selected from training images such that any two patches are at least a minimum angle apart, to provide diversity among reference patches. As used herein, a patch refers to an M×N block of pixels within an image, where M and N may be the same number or different numbers.

The systems and techniques of this disclosure improve the performance of a neural network. In particular, the neural network defenses presented in the implementations of this disclosure are non-differentiable, thereby making it non-trivial for an adversary to find gradient-based attacks. In addition, the implementations of this disclosure do not require a neural network to be fine-tuned using adversarial examples, thereby increasing robustness relative to unknown attacks. The neural network defenses presented in the implementations of this disclosure have been shown to yield benefits in black box, grey-box, and white-box settings.

The systems and methods that are described herein can be applied in the context of any system that processes images to determine the content of the images. As one example, the systems and methods that are described herein can be utilized in an object detection system that is utilized by an autonomous driving system to make control decisions. As another example, the systems and methods that are described herein can be utilized in an augmented reality or mixed reality system that processes images to identify the types of objects present and the locations of the objects.

Figure 1:
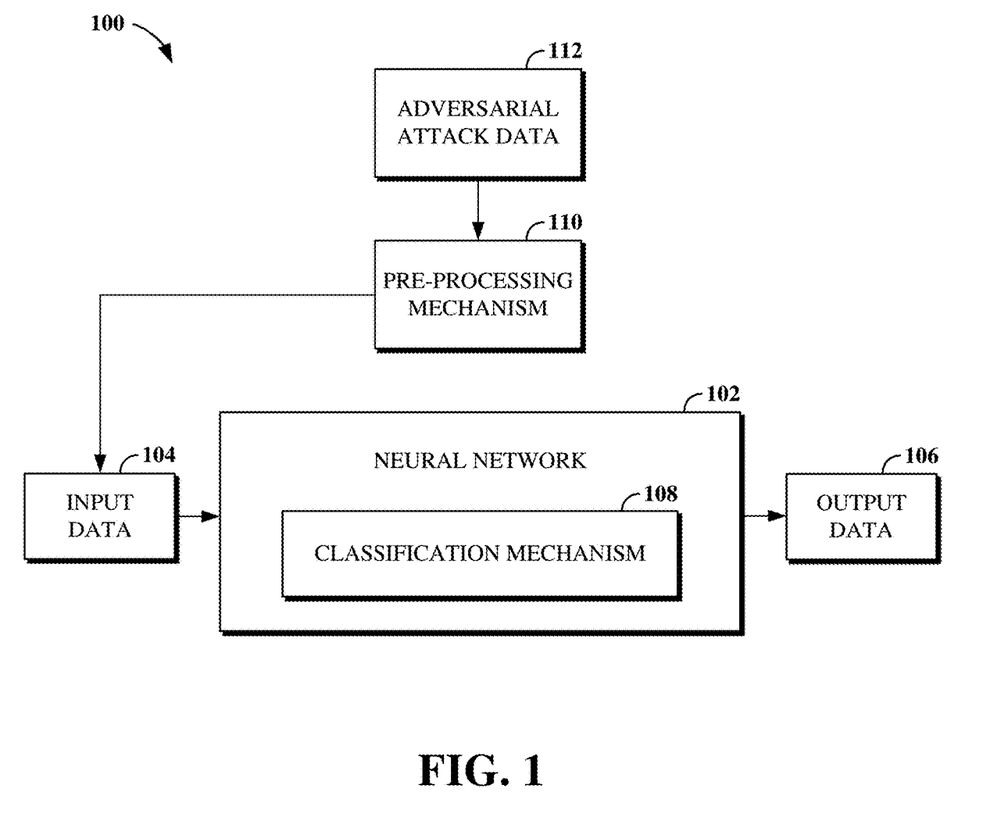
FIG. 1 is a block diagram showing an example of a system for training a neural network to defend against adversarial attacks.

FIG. 1 is a block diagram showing an example of a system 100 for training a neural network to defend against adversarial attacks. The system 100 includes a neural network 102, which may be implemented using one or more computing devices. The neural network 102 is a deep neural network or another neural network that uses deep learning. Alternatively, the neural network 102 may represent an implementation of another machine learning system, for example, a cluster, a Bayesian network, or another machine learning approach.

The neural network 102 receives and processes input data 104 to produce and transmit or store output data 106. The input data 104 may refer to data that can be processed using a trained neural network. The input data 104 may refer to a training data set (e.g., as used to retrain or otherwise enhance existing training for the neural network 102) or data for classification by the neural network 102. For example, where the neural network 102 is used to classify image data based on the contents of images, the input data 104 may be an image.

The output data 106 may represent the results of the neural network 102 processing on the input data 104. For example, the output data 106 can reflect the classification for an input image. The output data 106 may be processed or generated using a classification mechanism 108 of the neural network 102. The classification mechanism 108 processes the input data 104 based on the contents thereof and determines, such as using the trained neurons, filters, or other elements of the neural network 102, what those contents are.

The system 100 further includes a pre-processing mechanism 110. The pre-processing mechanism 110 includes functionality pre-processing data to be received by the neural network 102, such as to prevent that data from being misclassified based on perturbations within the data. The pre-processing mechanism 110 intercepts adversarial attack data 112 intended to cause the neural network 102 to misclassify some type or types of data. Returning the above example in which the neural network 102 processes images, the adversarial attack data 112 can be or represent an image including one or more noise-based perturbations.

As used herein, a noise-based perturbation refers to some amount of noise within an image that causes a decrease in quality of the image or which would otherwise result in a decrease in the classification accuracy of the image. The adversarial attack data 112 can refer to data that has been intentionally manipulated to include, or identified as including, a noise-based perturbation. Alternatively, the adversarial attack data 112 may refer to data that happens to include a noise-based perturbation, such as without malicious or deliberate intention.

The pre-processing mechanism 110 processes the adversarial attack data 112 to remove the data therefrom which could otherwise cause a misclassification by the neural network 102. The pre-processing mechanism 110 then outputs the input data 104 to the neural network 102. The input data 104 in this context refers to the pre-processed adversarial attack data 112 in which the noise-based perturbations have been reduced or entirely removed.

Implementations of the system 100 may differ from what is shown and described with respect to FIG. 1. In some implementations, the pre-processing mechanism 110 may be included within the neural network 102. For example, the pre-processing mechanism may represent a software component that processes data and directly transmits it to a first convolutional layer of the neural network 102 for classification.

Figure 2:
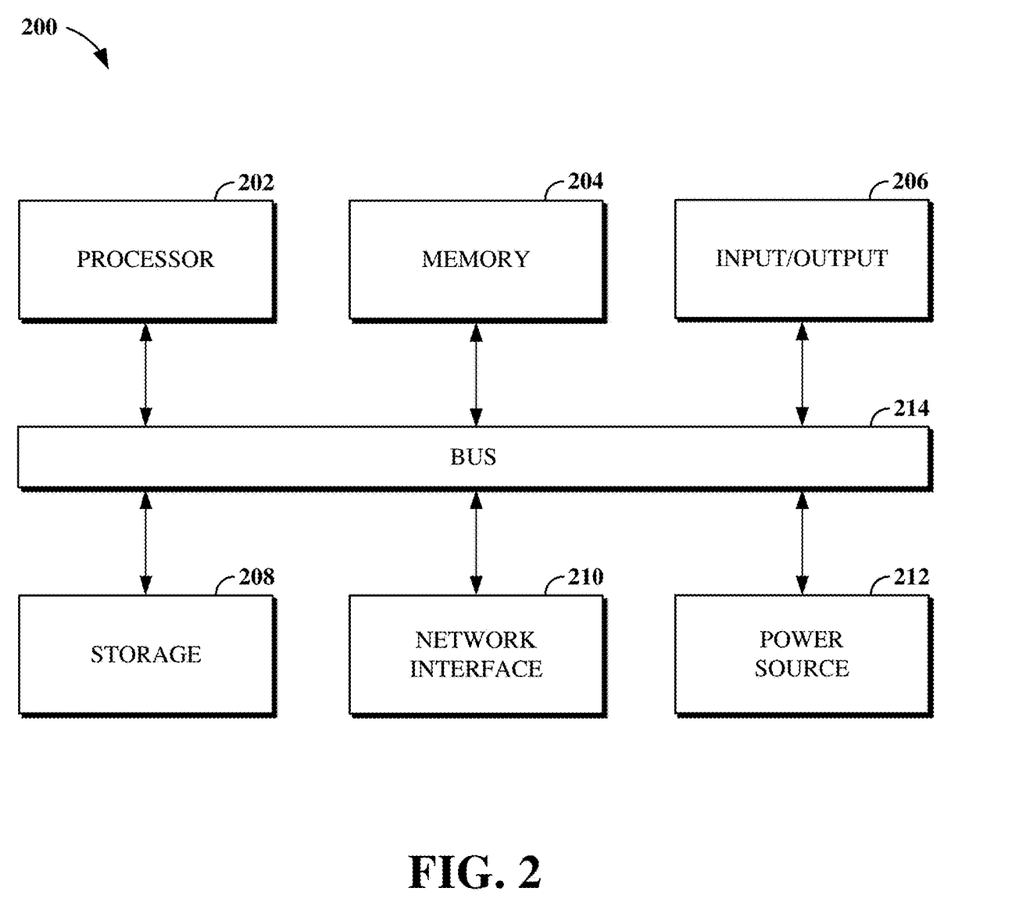
FIG. 2 is a block diagram showing an example of an internal configuration of a computing device used to implement a neural network.

FIG. 2 is a block diagram showing an example of an internal configuration of a computing device 200 used to implement a neural network, for example, the neural network 102 shown in FIG. 1. The computing device 200 includes a processor 202, a memory 204, one or more input/output devices 206, a storage device 208, a network interface 210, and a power source 212. The computing device 200 also includes a bus 214 that interconnects one or more of the processor 202, the memory 204, the one or more input/output devices 206, the storage device 208, the network interface 210, or the power source 212.

The processor 202 is operable to execute computer program instructions and perform operations described by the computer program instructions. For example, the processor 202 may be a central processing unit or other device configured for manipulating or processing information. The processor 202 may include one or more single- or multi-core processors. The memory 204 may be a volatile, high-speed, short-term information storage device such as a random-access memory module. The memory 204 may include data for immediate access by the processor 202, for example, computer program instructions executable by the processor 202.

The one or more input/output devices 206 may include one or more input devices and/or one or more output devices. Examples of input devices include a button, a switch, a keyboard, a mouse, a touchscreen input device, a gestural input device, or an audio input device. Examples of output devices include a display screen or an audio output. The storage device 208 may be a non-volatile information storage device such as a disk drive, a solid-state drive, a flash memory device, or another device configured for persistent electronic information storage.

The network interface 210 includes a physical or virtual connection to a network, such as the Internet, a local area network, a wide area network, or another public or private network. For example, the network interface 210 may include an Ethernet port, a wireless network module, or the like, or a combination thereof. The network interface 210 may be used to transmit data to or receive data from other computing devices. The power source 212 includes a source for providing power to the computing device 200. For example, the power source 212 may be a battery. In another example, the power source 212 may be or otherwise include an interface to a power system external to the computing device 200.

Implementations of the computing device 200 may differ from that which is shown and described. In some implementations, the input/output devices 206 may be omitted. For example, the computing device 200 may not include an input device, but instead receive instructions, commands, or other input using the network interface 210. In another example, the computing device 200 may not include an output device, but instead transmit instructions, commands, or other output using the network interface 210. In yet another example, the computing device 200 may not include input devices or output devices.

Figure 3:
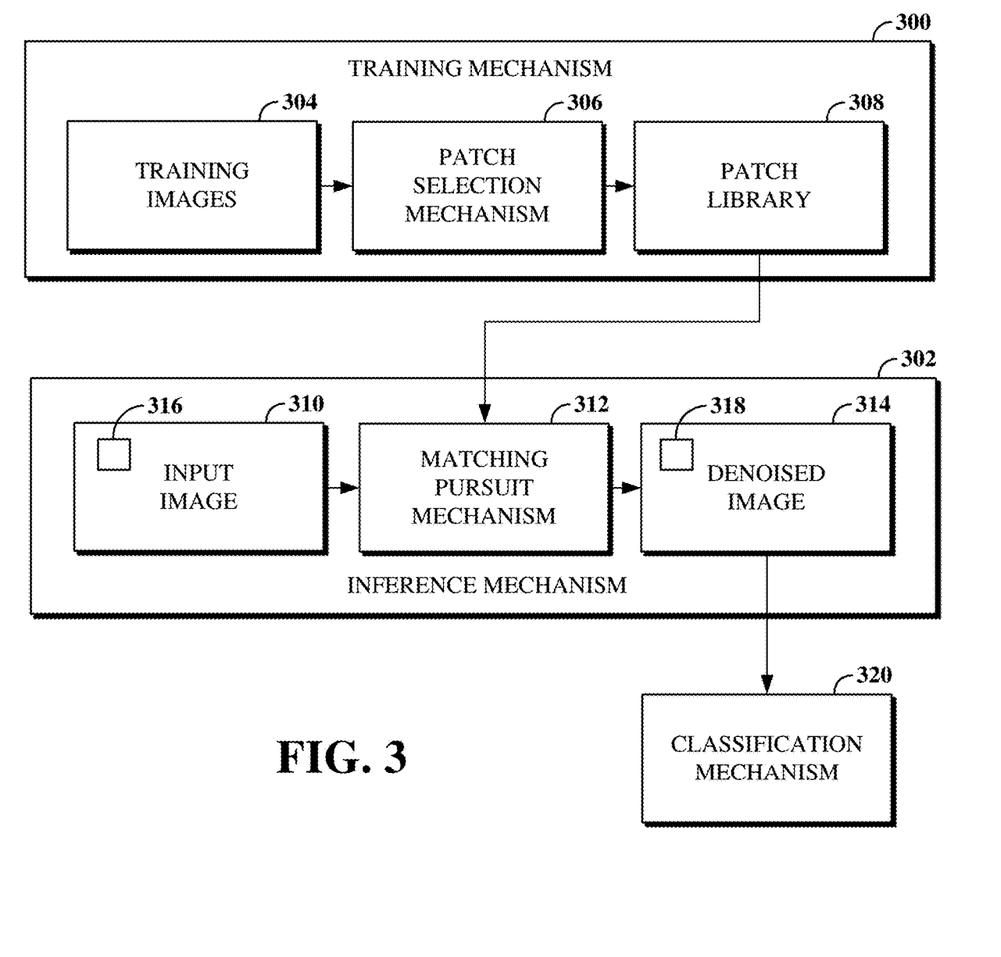
FIG. 3 is a block diagram showing an example of software mechanisms used to prepare an input image for classification by a neural network.

FIG. 3 is a block diagram showing examples of software mechanisms used prepare an input image for classification by a neural network, such as the neural network 102 shown in FIG. 1, to recognize adversarial attacks. The software mechanisms shown in FIG. 3 may reflect or otherwise include software executable, interpretable, or otherwise performed at a computing device used to implement the neural network 102 or at a computing device used to train or otherwise modify the neural network 102. For example, the software mechanisms shown in FIG. 3 may be or otherwise be included in the pre-processing mechanism 110 shown in FIG. 1.

The software mechanisms include a training mechanism 300 and an inference mechanism 302. The training mechanism 300 processes training images 304 using a patch selection mechanism 306 to construct or otherwise update a patch library 308. The inference mechanism 302 processes an input image 310 having a noise-based perturbation using a matching pursuit mechanism 312. The matching pursuit mechanism 312 uses patches stored in the patch library 308 to produce a denoised image 314 based on the input image 310. The denoised image 314 does not include the noise-based perturbation that was in the input image 310, or at least includes less of the noise-based perturbation. The denoised image 314 is then output to a classification mechanism 316 for classification by a neural network. For example, the classification mechanism 316 may be the classification mechanism 108 shown in FIG. 1.

The patch selection mechanism 306 divides the training images 304 into patches, and selected patches of the training images 304 are saved in the patch library 308 for later use in processing the input image 310. The patch selection mechanism 306 selects the patches to save in the patch library 308 such that those patches are a minimum distance apart from one other in the training images 304. The selected patches are selected based on their importance to improving classification accuracy for the neural network. As will be described below, selecting patches based on importance can include computation of a saliency map for each of the training images 304 and selecting the higher saliency patches to be saved in the patch library 308.

The patch library 308 refers to a collection of patches stored in some common data store or other storage. For example, the patch library 308 may be a gallery of patches from various ones of the training images 304. In another example, the patch library 308 may be a data file (e.g., a CSV file or a like file) that indicates locations and sizes of relevant patches within ones of the training images 304. As such, the data stored in the patch library 308 can be referenced to later identify patches available for producing the denoised image 314 based on the patches of the input image 310.

The patches included in the patch library 308 are used by the matching pursuit mechanism 312 to replace patches within the input image 310. The matching pursuit mechanism 312 uses a matching pursuit algorithm, which represents an input by sparse approximation using a dictionary (e.g., the patch library 308), to reconstruct replacement patches for patches of the input image into the denoised image 314. The input image 310 includes a number of source patches, such as a source patch 318, which includes some portion of the image data within the input image 310. The source patch 318 or data indicative thereof can be received as input by the matching pursuit mechanism 312.

The matching pursuit mechanism 312 uses that input to search the patch library 308 for patches that may be available to replace the source patch 318. Upon identifying an available patch, that available patch is reconstructed, along with other replacement patches identified from the patch library 308, to produce the denoised image 314. In particular, the denoised image 314 includes a replacement patch 320 representing the reconstructed patch selected from the patch library 308 to replace the source patch 318. The replacement patch 320 may be selected from the patch library 308 and used to replace the source patch 318 without modification. Alternatively, the replacement patch 320 may be produced as a linear combination of patches selected from the patch library 308. The linear combination of two or more patches from the patch library 308 is determined as a weighted combination (e.g., average) of those two or more patches. For example, where two patches, X, and Y, are processed in a linear combination to produce the replacement patch 320, the linear combination is reflected as AX+BY, where A and B represent weighting values. The weighting values may, for example, be constants defined in part by the number of patches used to produce the replacement patch 320.

To further describe the functionality of the software mechanisms shown in FIG. 3, reference is made to the problem formulation addressed using those software mechanisms. Assume that an operator $T(x)$ projects the input image $x \in \mathbb{R}^d$ to the closest subspace in a union of m dimensional subspaces. This operation is a linear projection operator onto an m dimensional subspace in a local neighborhood of x. For additive perturbations, the adversary is limited to locally seeking noise in an m dimensional subspace and the robustness p can ideally be improved by a factor of $\sqrt{d/m}$, such as described below with respect to FIG. 7.

The transformation to apply to the input image (e.g., using the matching pursuit mechanism 312) should thus satisfy conditions reflecting that rank $J_T(x) \ll d$, where $x \in \mathbb{R}^d$, where $J_T(x)$ is the Jacobian matrix in a small neighborhood of x, and also that $\|T(x)-x\|$ is relatively small. The first condition ensures that the local dimensionality is low, whereas the second condition ensures that the image and its transformed version are close enough to each other such that the visual information thereof is preserved.

This transformation is reflected in the operations of the matching pursuit mechanism 312, which divides the input image 310 into multiple patches and denoises them independently with sparse reconstruction using the patch library 308. The sparsity (e.g., the number of components used to reconstruct a patch) can be represented as K, where each patch is P×P pixels. Then, for non-overlapping patches, the local dimensionality of the projection operator T (.) would be $$\kappa \frac{d}{P^2}.$$

This dimensionality reduction would ideally improve robustness by a factor of $$\frac{P}{\sqrt{\kappa}}.$$

In particular, the matching pursuit mechanism 312 processes the source patches of the input image 310 against patches included in the patch library 308 to determine a matching rate. The matching rate represents the fraction of patches that are identical in the denoised image 314 (e.g., represented as T(x+v)) and the input image 310 (e.g., represented as T(x)). Let $\{p_1, p_2, \ldots, p_n\}$ and $\{\hat{p}_1, \hat{p}_2, \ldots, \hat{p}_n\}$ be patches extracted from x and x+v, respectively. The matching rate is thus defined as, MR= $\mathbb{E}_{x \in D}(\gamma(x))$, where:

$$\gamma(x) = \frac{1}{n} \sum_{j=1}^{n} \mathbb{1}\|T(\hat{p}_j)\|_\infty \leq \delta$$

An implementation of an algorithm performed using the matching pursuit mechanism 312 is expressed as follows:

$q \leftarrow 0$ $\hat{p} \leftarrow p$ for $i=1$ to $k$ do $a \leftarrow \hat{p}^T S_i$ $l \leftarrow \text{argmax}_k |a_k|$ $q \leftarrow q + a_l s_l$ $q \leftarrow \hat{q} - a_l s_l$ return $q$ T(.) is assumed to be applied to patches. A higher matching rate thus corresponds to the neural network being more robust to noise-based perturbations. A reconstruction error is then determined as the average $l_2$ distance between the clean image x and the transformed image T(x). For example, the reconstruction error RE can be determined as follows:

$$RE = \mathbb{E}_{x \in D}(\|x - T(x)\|_2 / \|x\|_2)$$

in which a higher reconstruction quality (e.g., 1-RE) results in higher classification accuracy for the clean images as more information is retained. These proxy metrics are highly correlated with accuracy and robustness of the classifier.

Given, however, that the robustness of the matching pursuit mechanism 312 depends upon the robustness of the patch library 308, an efficient greedy algorithm may be used by the patch selection mechanism 306 to scale up the patch library 308. For example, rather than have a single patch library 308, a number of training libraries may be produced based on different sparsity levels. For example, each of the training libraries can be constructed to include patches of differing sparsity. When the matching pursuit mechanism 312 searches for replacement patches, the searching can include identifying a training library to search based on a sparsity level defined for the source patches or otherwise associated with the input image 310.

For example, let $\{S_i\}_{i=1}^{k}$ be a set of patch libraries constructed using the patch selection mechanism 306. Each patch library $S_i \in \mathbb{R}^{P^2 \times n}$ may be represented as a matrix containing η columns of dimension $P^2$. Further, k may represent the sparsity for the patch library. The first patch library $S_1$ is used to select a first atom, while reconstructing a given patch p. Then, the residual can be computed between the image patch p and the selected atom $s_l$. The residual can then be used to select the next atom, but where a different patch library $s_i$ is used to select at the $i^{th}$ sparsity level.

An implementation of an algorithm performed using the patch selection mechanism 306 is expressed as follows:

for $i=1$ to $k$ do $n \leftarrow 0$ $S_i \leftarrow [\ ]$ while $n < \eta$ do

Randomly select $x \in D$.

Compute saliency map $\mathcal{H}(x)$.

Randomly select patch s from x according to $\mathcal{H}(x)$.

if $i=1$ then $s \leftarrow D3\text{-}MP(\{S_1\}, s)$

//Add s to $S_1$ if it arcsin($\in$) away.

if $\|s-s\|2/\|s\|_2 > \in$ then

Concatenate $s/\|s\|_2$ to columns of $S_i$ $n \leftarrow n+1$ else $s \leftarrow D3\text{-}MP(\{S_j\}_{j=1}^{i-1}, s)$ $r \leftarrow s - \hat{s}$ // Add $r$ to $S_i$ if it is $\arcsin(\epsilon)$ away.

$\hat{r} \leftarrow D3\text{-}MP(\{S_i\}r)$ if $\|r-\hat{r}\|_2/\|r\|_2 > \in$ then Concatenate $r/\|r\|_2$ to columns of $S_i$ $n \leftarrow n+1$ The set of patch libraries is constructed in a greedy manner by selecting the patches that effectively demonstrate differences from one another. As such, the above example algorithm performed using the patch selection mechanism 306 takes into account the saliency information of images. The norm of the gradient of the classification function with respect to the input image 310 is used as the saliency map. Importance sampling is performed among some or all of the patches with respect to the saliency map. A patch is thus added to the patch library if the reconstruction of that patch using the existing patch library has greater than a threshold, $\in$, angular distance from the patch.

The saliency map helps to preserve the details that are important for the classification task by the neural network, whereas the cutoff on the angular distance ensures that the patch library is diverse. The diversity among dictionary atoms encourages mapping a clean and corresponding noisy image patch to the same dictionary atom. Ensuring that two given patches from the patch library are of a certain threshold in distance also improves the matching rate and the robustness of the classifier.

After the first patch library is constructed, the image patches selected therefrom are reconstructed using that first patch library. Residuals are then computed based on the reconstruction. The next patch library may then be constructed based on the residual images instead of the original images. This process is repeated for all the remaining patch libraries, as described in the above example algorithm performed using the patch selection mechanism 306.

Figure 4:
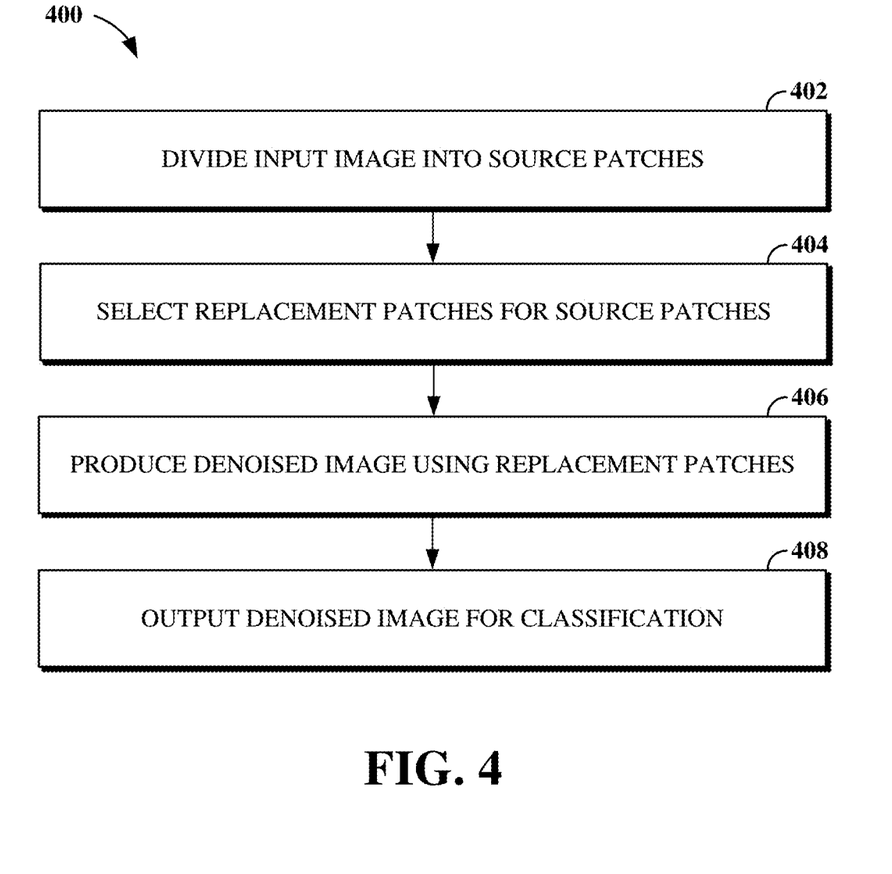
FIG. 4 is a flowchart showing an example of a technique for defending against an adversarial attack by preparing an input image for classification by a neural network.

FIG. 4 is a flowchart showing an example of a technique 400 for defending against an adversarial attack by preparing an input image for classification by a neural network. At 402, an input image is divided into source patches. The source patches may be of the same or different sizes. Some or all of the source patches may be overlapping. Alternatively, the source patches may be non-overlapping. At least one of the source patches within the input image includes a noise-based perturbation. The noise-based perturbation may cause a misclassification of the input image by a neural network. As such, the remaining operations of the technique 400 process the input image to prevent the neural network from classifying image data associated with the noise-based perturbation.

At 404, replacement patches are selected for the source patches. Selecting the replacement patches includes identifying candidate patches available for replacing each of the source patches within the input image. The candidate patches may be identified by searching a patch library based on the sizes of the source patches. The patch library includes a number of patches selected from training images. A replacement patch may be produced using a linear combination of two or more of those identified candidate patches. Alternatively, one of those identified candidate patches may be selected as a replacement patch. As such, selecting a replacement patch for a source patch can include determining a replacement patch using a linear combination of candidate patches. Implementations and examples for constructing a patch library including candidate patches are described below with respect to FIG. 5.

At 406, a denoised image is produced using the replacement patches. Producing the denoised image using the replacement patches includes reconstructing the replacement patches into the denoised image. The replacement patches are reconstructed based on the locations of the corresponding source patches they replace within the input image. Where the replacement patches are overlapping, the reconstruction includes averaging the overlapping pixel values. In that the denoised image is comprised of the replacement patches and not the source patches, the denoised image does not include the noise-based perturbation from the source patches. The denoised image thus has a lower dimensionality than the input image.

The denoised image may be one of a number of candidate denoised images produced using replacement patches selected for the source patches of the input image. For example, the denoised image may be selected from amongst the candidate denoised images based on reconstruction errors determined for each of those denoised images. Implementations and examples for selecting a denoised image from a number of candidate denoised images based on reconstruction errors are described below with respect to FIG. 6. At 408, the denoised image is output to a neural network for classification.

In some implementations, producing the denoised image can include reconstructing the replacement patches according to a defined sparsity level. The defined sparsity level reflects a degree of sparsity used to identify the candidate patches selected as replacement patches when searching in the patch library. Further, the patch library may be one of a number of patch libraries available for such searching. For example, each of the patch libraries may be associated with a different sparsity level. In such an implementation, identifying the candidate patches available for replacing the source patches can include selecting the patch library to search based on the defined sparsity level. In some implementations, where the replacement patches are produced based on linear combinations of candidate patches, the candidate patches used to produce the replacement patches may be selected from one or more patch libraries.

In some implementations, replacement patches may not be selected for all of the source patches. For example, the technique 400 may include scanning or otherwise pre-processing the input image to identify source patches that include noise-based perturbations. Replacement patches may then be found for those source patches alone. As such, the denoised image produced using the replacement patches may include both of replacement patches and source patches.

In some implementations, the replacement patches may be used to produce the denoised image responsive to a determination that enough of those replacement patches match source patches from the input image. For example, the technique 400 can include determining that a number of the replacement patches match individual ones of the source patches. A determination can then be made as to whether the number of the replacement patches meets a threshold. The threshold may, for example, reflect a minimum number of source patches to match in order for the replacement patches to be used to produce the denoised image.

Figure 5:
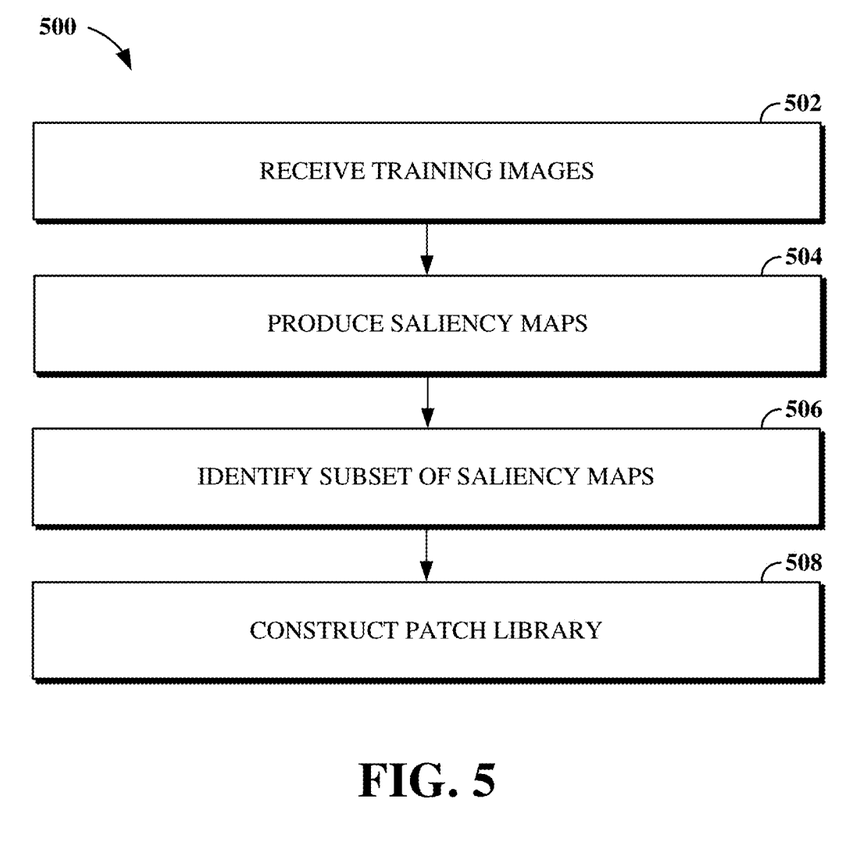
FIG. 5 is a flowchart showing an example of a technique for constructing a patch library including candidate patches.

FIG. 5 is a flowchart showing an example of a technique 500 for constructing a patch library including candidate patches. At 502, a set of training images is received. The training images may include images of the same or different sizes, which images may include the same or different image data. The training images may be transmitted from a computing device external to a neural network that receives an image pre-processed using the constructed patch library. Alternatively, the training images may be transmitted from a computing device internal to the neural network.

At 504, saliency maps are produced for the training images. In particular, the saliency maps are produced based on differences between individual ones of the training images. Producing a saliency map includes comparing collocated patches from each of some number of different training images (e.g., 2 to N, where N represents the total size of the set of training images) to determine those patches that include different data. The training images that are compared in this way may be randomly selected from the set of training images. Alternatively, the training images may be selected in a queue-based or other priority.

At 506, a subset of the saliency maps is identified. The subset of the saliency maps reflects those saliency maps that show differences between portions of the training images. For example, the subset of the saliency maps may be those saliency maps having data differences exceeding a threshold. In another example, the subset of the saliency maps may be those saliency maps in which at least a threshold number of the training images were determined to include different data.

At 508, a patch library is constructed. Constructing the patch library includes producing a software library that includes patches from the individual training images that were identified in the subset of the saliency maps. As such, the patch library includes individual patches of image data rather than complete images. Alternatively, the patch library may include complete images and data indicating which patches in those images are usable as candidate patches for the later pre-processing of input images.

In some implementations, constructing the patch library may include updating an existing patch library to include the patches from the individual training images that were identified in the subset of the saliency maps.

In some implementations, the size of the patch library may be controlled using the technique 500. Given that the matching rate for patches decreases as sparsity is increased, the neural network is less robust to noise-based perturbations when the matching rate decreases. The size of the patch library thus plays a role in the accuracy and robustness tradeoff. For example, a larger patch library may improve the accuracy on the clean images because the images are better reconstructed. However, a smaller dictionary generally improves the robustness because the dictionary atoms are, on average, farther apart.

Figure 6:
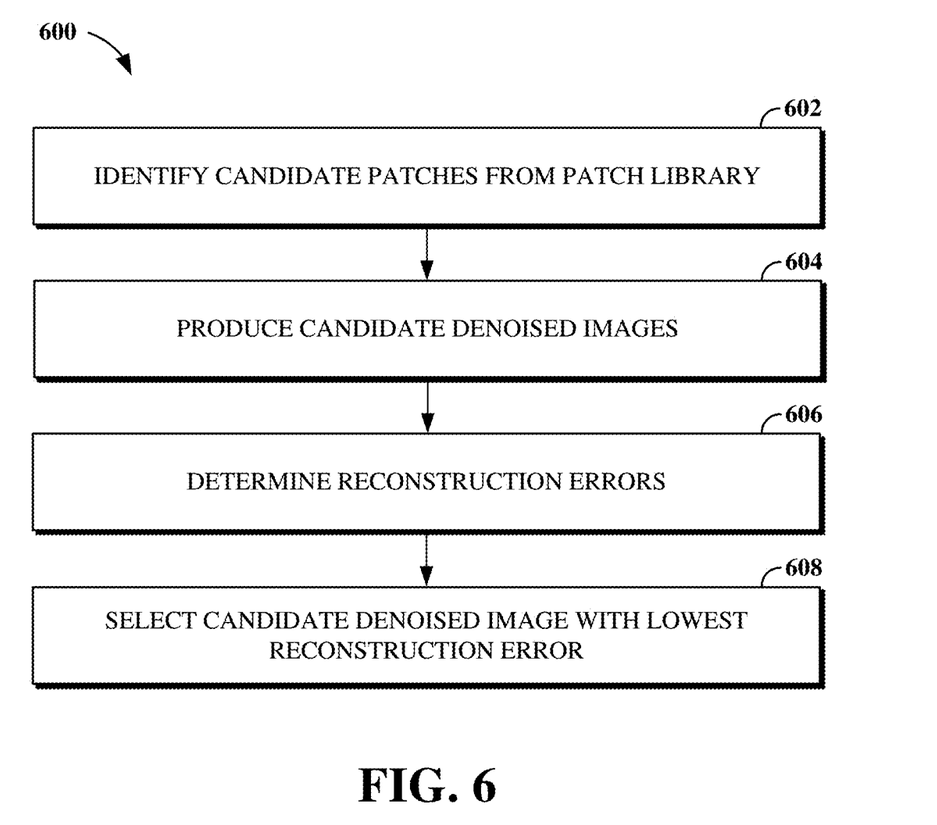
FIG. 6 is a flowchart showing an example of a technique for selecting a denoised image from a number of candidate denoised images based on reconstruction errors.

FIG. 6 is a flowchart showing an example of a technique 600 for selecting a denoised image from a number of candidate denoised images based on reconstruction errors. At 602, candidate patches are identified from a patch library. Identifying the candidate patches from the patch library include searching the patch library for patches based on sizes of source patches from an input image. The search can be done for individual patches or for multiple patches. The candidate patches may be produced using linear combinations of patches selected from the patch library. Alternatively, the candidate patches may represent the patches selected from the patch library, such as without modification.

At 604, candidate denoised images are produced using the candidate patches. In particular, the candidate denoised images are produced based on combinations of candidate patches available to replace ones of the source patches within the input image. At least some of the candidate patches identified from the patch library are reconstructed to form each of the candidate denoised images.

At 606, reconstruction errors are determined for the candidate denoised images. Determining a reconstruction error for one the candidate denoised images includes comparing the source patches of the input image to the candidate patches used to produce the candidate denoised image. The reconstruction error for that candidate denoised image is then determined based on the differences between the source patches and the candidate patches. Alternatively, the reconstruction error for the candidate denoised image can be determined by comparing the input image as a whole to the candidate denoised image as a whole.

At 608, the candidate denoised image with the lowest reconstruction error is selected. The selected candidate denoised image is the used as the denoised image, which is output to the neural network for classification.

In some implementations, the reconstruction errors can be determined for the candidate patches identified from the patch library rather than for the candidate denoised images. For example, producing a candidate denoised image can include determining reconstruction errors based on differences between a particular source patch and individual ones of the candidate patches. The candidate patch that has the lowest one of the reconstruction errors can then be selected for use in producing the candidate denoised image. This can repeat until each of the candidate patches to use to produce the candidate denoised image has been selected.

In some implementations, identifying the candidate patches can include randomizing certain data of the patch library. For example, the technique 600 can include randomizing over columns of the patch library by randomly selecting a fraction (e.g., ⅕) of the atoms in the patch library. In another example, the technique 600 can include randomizing by first selecting the top N (e.g., 2) highest correlated atoms from the patch library and randomly selecting one of them.

The technique 400, the technique 500, and/or the technique 600 can be executed using one or more computing devices, such as using one or more processors that execute instructions stored in one or more memories. The technique 400, the technique 500, and the technique 600 are examples of techniques for training a neural network to defend against adversarial attacks. Other techniques may also or instead be used for training a neural network to defend against adversarial attacks.

Figure 7:
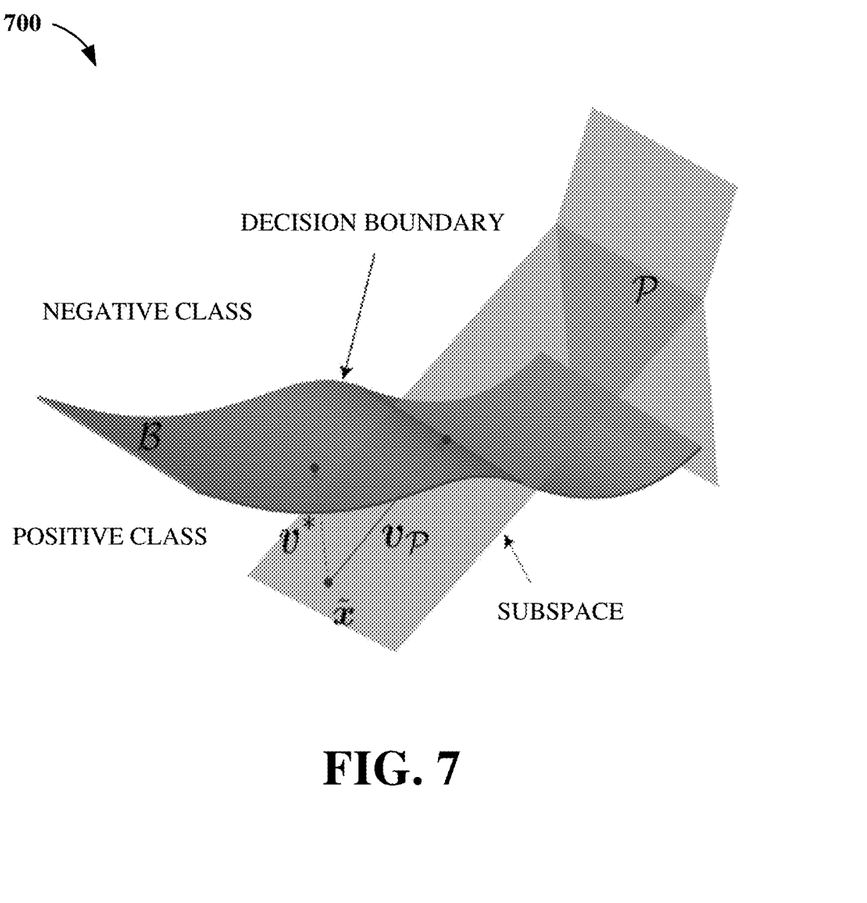
FIG. 7 is an illustration showing an example of a relationship between dimensionality and robustness when preparing an input image for classification by a neural network.

FIG. 7 is an illustration showing an example of a relationship 700 between dimensionality and robustness when preparing an input image for classification by a neural network. As can be seen, reducing dimensionality improves the robustness of the neural network classifier. P is a union of subspaces illustrated by the blue hyperplanes. The image projected to the nearest subspace in P is represented as $\hat{x}=T(x)$. The adversarial noise $v^*$ is the smallest distance from $\hat{x}$ to the decision surface B of the classifier. When the adversary is restricted to a smaller dimensional subspace (e.g., the projected hyperplane), the norm of the noise $v_P$ is larger than the norm of $v^*$ to cross the decision boundary.

What is claimed is:

1. A method for preparing an input image for classification by a neural network, the method comprising:
receiving the input image at a system having a plurality of image patches;
dividing the input image into source patches, wherein at least one of the source patches includes a noise-based perturbation;

selecting replacement patches for the source patches by:
    identifying, from the plurality of image patches, candidate patches that are available for replacing a respective source patch within the input image;
    determining reconstruction errors based on differences between the respective source patch and ones of the candidate patches; and
    determining, based on the reconstruction errors, the replacement patch for the respective source patch using one or more of the candidate patches;
using the replacement patches selected for the source patches to produce a denoised image, wherein the denoised image does not include the noise-based perturbation; and
outputting the denoised image to the neural network for classification.

2. The method of claim 1, wherein selecting the replacement patches for the source patches comprises:
    determining that a number of the replacement patches match respective ones of the source patches;
    determining whether the number of the replacement patches meets a threshold; and
    using the replacement patches responsive to determining that the number of the replacement patches meets the threshold.

3. The method of claim 1, wherein determining the reconstruction errors based on the differences between the respective source patch and the ones of the candidate patches comprises:
    producing candidate denoised images based on ones of the candidate patches; and
    determining the differences between the respective source patch and the ones of the candidate patches based on differences between the input image and ones of the candidate denoised images.

4. The method of claim 1, wherein determining the replacement patch for the respective source patch using the one or more of the candidate patches comprises:
    producing the replacement patch using a linear combination of at least two of the candidate patches.

5. The method of claim 1, wherein identifying, from the plurality of image patches, the candidate patches that are available for replacing the respective source patch within the input image comprises:
    searching a patch library for the candidate patches based on a size of the respective source patch.

6. The method of claim 5, the method comprising:
    constructing the patch library based on saliency maps for at least some of a set of training images.

7. The method of claim 6, wherein constructing the patch library based on the saliency maps for the at least some of the set of training images comprises:
    producing the saliency maps based on differences between individual training images of the set of training images;
    identifying a subset of the saliency maps reflecting differences between portions of the individual training images; and
    including patches from the individual training images in the patch library, the patches corresponding to the subset of the saliency maps.

8. A method for preparing an input image for classification by a neural network, the method comprising:
    dividing the input image into source patches, wherein at least one of the source patches includes a noise-based perturbation;
    selecting replacement patches for the source patches by:
        identifying candidate patches available for replacing a respective source patch within the input image by searching a patch library for the candidate patches based on a size of the respective source patch, wherein the patch library is selected from a plurality of patch libraries based on a defined sparsity level;
        determining reconstruction errors based on differences between the respective source patch and ones of the candidate patches; and
        determining, based on the reconstruction errors, the replacement patch for the respective source patch using one or more of the candidate patches;
    using the replacement patches selected for the source patches to produce a denoised image by reconstructing the replacement patches into the denoised image according to the defined sparsity level, wherein the denoised image does not include the noise-based perturbation; and
    outputting the denoised image to the neural network for classification.

9. An apparatus for preparing an input image for classification by a neural network, the apparatus comprising:
    a memory; and
    a processor configured to execute instructions stored in the memory to:
        receive the input image, the input image including source patches, wherein at least one of the source patches includes a noise-based perturbation;
        produce candidate denoised images based on combinations of candidate patches available to replace ones of the source patches within the input image;
        select, as a denoised image, a one of the candidate denoised images having a lowest reconstruction error; and
        output the denoised image to the neural network for classification.

10. The apparatus of claim 9, wherein the instructions to select, as the denoised image, the one of the candidate denoised images having the lowest reconstruction error include instructions to:
    determine a reconstruction error for one the candidate denoised images based on differences between the source patches of the input image and the candidate patches combined to produce the one of the candidate denoised images.

11. The apparatus of claim 9, wherein the instructions to select, as the denoised image, the one of the candidate denoised images having the lowest reconstruction error include instructions to:
    select the one of the candidate denoised images as the denoised image responsive to a determination that the one of the candidate denoised images includes a threshold number of candidate patches that match corresponding ones of the source patches.

12. The apparatus of claim 9, wherein the denoised image has a lower dimensionality than the input image.

13. The apparatus of claim 9, wherein the instructions to produce the candidate denoised images based on the combinations of the candidate patches available to replace the source patch within the input image include instructions to:
    search a patch library based on sizes of the source patches;
    determine at least some of the candidate patches based on linear combinations of patches identified from the search; and
    reconstruct the some of the candidate patches into one of the candidate denoised images.

14. The apparatus of claim 13, wherein the instructions include instructions to:
- produce saliency maps based on differences between individual training images of a set of training images;
- identify a subset of the saliency maps that reflect differences between portions of the individual training images; and
- construct the patch library, wherein the patch library includes patches from the individual training images in the patch library, the patches corresponding to the subset of the saliency maps.

15. The apparatus of claim 14, wherein the patch library is a first patch library and the saliency maps are produced according to a first sparsity level, wherein the instructions include instructions to:
- construct a second patch library based on other saliency maps produced according to a second sparsity level.

16. A non-transitory computer-readable storage device including program instructions executable by one or more processors that, when executed, cause the one or more processors to perform operations for using a patch library to prepare an input image for classification by a neural network, the operations comprising:
- receiving training images, each of the training images including training patches;
- producing saliency maps based on comparisons of collocated training patches from different ones of the training images;
- identifying a subset of the saliency maps reflecting differences between the ones of the training images;
- constructing the patch library based on the subset of the saliency maps, the patch library including a set of candidate patches available for replacing a source patch within the input image, wherein the source patch includes a noise-based perturbation;
- producing a denoised image using at least some of the set of candidate patches, wherein none of the candidate patches used to produce the denoised image includes the noise-based perturbation; and
- outputting the denoised image to the neural network for classification.

17. The non-transitory computer-readable storage device of claim 16, wherein the patch library is a first patch library and the saliency maps are produced according to a first sparsity level, the operations comprising:
- constructing a second patch library based on other saliency maps produced according to a second sparsity level.

18. The non-transitory computer-readable storage device of claim 16, wherein the operations for producing the denoised image using the at least some of the set of candidate patches comprise:
- searching the patch library based on sizes of the source patches;
- determining at least some of the candidate patches based on linear combinations of patches identified from the search; and
- reconstructing the some of the candidate patches into the denoised image.

19. The non-transitory computer-readable storage device of claim 18, the operations comprising:
- determining a reconstruction error for the denoised image based on differences between the source patches of the input image and the candidate patches reconstructed to produce the denoised image.

20. The non-transitory computer-readable storage device of claim 19, wherein the denoised image is one of a number of candidate denoised images produced, wherein reconstruction errors are determined each of the candidate denoised images, the operations comprising:
- selecting the denoised image responsive to a determination that the reconstruction error determined for the denoised image is the lowest of the reconstruction errors.

* * * * *

UNITED STATES PATENT AND TRADEMARK OFFICE
CERTIFICATE OF CORRECTION

PATENT NO. : 10,984,272 B1
APPLICATION NO. : 16/241011
DATED : April 20, 2021
INVENTOR(S) : Ashish Shrivastava, Cuneyt Oncel Tuzel and Seyed Moosavi-Dezfooli It is certified that error appears in the above-identified patent and that said Letters Patent is hereby corrected as shown below:

In the Specification

At Column 12, Line number 6, "for one the candidate" should be --for one of the candidate--.

In the Claims

At Column 14, Claim number 10, Line number 42, "for one the candidate" should be --for one of the candidate--.

At Column 16, Claim number 20, Line number 32, "are determined each" should be --are determined for each--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*